United States Patent
Madsen

(10) Patent No.: US 7,825,829 B2
(45) Date of Patent: Nov. 2, 2010

(54) MODULATED LIGHT TRIGGER FOR LICENSE PLATE RECOGNITION CAMERAS

(75) Inventor: Torben H. Madsen, Copenhagen (DK)

(73) Assignee: Jai, Inc. USA, San Jose, CA (US)

( * ) Notice: Subject to any disclaimer, the term of this patent is extended or adjusted under 35 U.S.C. 154(b) by 796 days.

(21) Appl. No.: 11/803,577

(22) Filed: May 15, 2007

(65) Prior Publication Data

US 2008/0285803 A1 Nov. 20, 2008

(51) Int. Cl.
G08G 1/017 (2006.01)
(52) U.S. Cl. .................. 340/937; 340/933; 382/105
(58) Field of Classification Search .......... 340/902, 340/933, 425.5, 469, 942, 438, 937, 439, 340/600, 602, 458; 315/82, 83, 77; 362/464–469; 701/1, 36; 382/255, 104, 405; 348/311, 348/164–168
See application file for complete search history.

(56) References Cited

U.S. PATENT DOCUMENTS

| | | | | |
|---|---|---|---|---|
| 5,489,777 | A | * | 2/1996 | Stedman et al. .......... 250/338.5 |
| 5,591,975 | A | * | 1/1997 | Jack et al. ............... 250/338.5 |
| 6,650,765 | B1 | * | 11/2003 | Alves ....................... 382/105 |
| 7,016,518 | B2 | * | 3/2006 | Vernon ...................... 382/105 |
| 7,504,965 | B1 | * | 3/2009 | Windover et al. .......... 340/937 |

OTHER PUBLICATIONS

Information/specification re JAI Progressive Scan IT CCD TS-9720EN/TSC-9720EN, Jan. 26, 2007.
Information/Specification re JAI Ethernet System VIS-300/400, May 31, 2006.
PIPS Technology Information/Specification re Spike + Model #P372P, Jul. 2006.

* cited by examiner

*Primary Examiner*—Anh V La
(74) *Attorney, Agent, or Firm*—Thomas E. Schatzel; Thomas E. Schatzel, A Prof. Corp.

(57) ABSTRACT

A camera system comprises a CCD imaging device, an infrared illumination source, and a power modulator for amplitude modulating the infrared illumination, e.g., with a 7-kHz tone. A beam splitter is set in front of the CCD imaging device, and a photo-diode array is attached to the beam splitter to detect modulated infrared light returning from the same field of vision as the CCD imaging device Various tone filters, and triggers connected to the tone filters, will cause the CCD imaging device to take a digital picture when the returning modulated infrared light exceeds some threshold and comes from right areas of a picture frame. Such digital pictures will most probably include an image of a vehicle license plate that can be processed, and the results used to extract the registration data from a database.

9 Claims, 3 Drawing Sheets

MODULATED LIGHT TRIGGER FOR LICENSE PLATE RECOGNITION CAMERAS

FIELD OF THE INVENTION

The present invention relates to electronic imaging devices, and more particularly to methods and devices for reducing the number of pictures taken by a digital camera and still capture those images of vehicle license plates moving by that will produce useful results.

DESCRIPTION OF THE PRIOR ART

Character recognition has come a long way and it is now possible for street mounted digital cameras to read the license plates of passing vehicles. The retro-reflective materials universally used in vehicle license plates makes them far more readable by humans and machines alike. The images of the license plate characters will be sharp and distinct, and just a little bit of background or flash lighting will produce brilliant images.

Infrared light is conventionally used by JAI-Pulnix (San Jose, Calif.), PIPS Technology (Knoxville, Tenn.), and others, to illuminate and machine-read vehicle license plates without distracting or flashing a glare in the eyes of the vehicle drivers.

The JAI type-VIS Traffic Camera (TM-9701TC-862) uses a progressive interline transfer charge coupled imaging device (CCD) to capture all of the vertical resolution at once with no field-to-field imaging delays. Progressive scanning allows the VIS camera to freeze a rapidly moving vehicle at high resolution without the need for a mechanical shutter. The model TM-9701TC-862 VIS camera provides a 768 pixel by 484 line image, with resolution for up to one full traffic lane width of coverage, depending on the thickness of license plate characters. Shutter speeds are variable from $1/16000$ second to $1/2000$ second The VIS traffic camera can operate in asynchronous or synchronous modes. In asynchronous mode, the VIS camera snaps a picture on receipt of a TTL trigger. In synchronous mode, the VIS camera produces a new picture every $1/30$ second, e.g., live video. The camera can be switched between modes through a software command. The video output of the VIS camera conforms to the RS-170 standard to simplify viewing images during installation. A flash trigger output is provided with the camera to precisely synchronize flash triggering by the camera's image capturing. The VIS camera comprises a zoom lens, antiglare filter, and interface circuitry in a heated weather-proof enclosure.

The JAI Video Image Capture (VIC) subsystem integrates the VIS with an image capture and storage computer. The JAI VIC Subsystem is used for ITS applications that require capturing, temporarily buffering, optionally processing, and then transmitting high quality images to a central site over an Ethernet link. For example, electronic toll violation enforcement, video-based tolling, ticket-less parking lots, link travel time, work-zone safety, segment speed enforcement, and controlled access monitoring. The VIS provides a dynamic range management technique that ensures consistently high image quality under all ambient lighting conditions regardless of plate type and color combinations. The VIC computer stores the VIS images, associates ancillary data with the image (e.g., lane controller information), and then notifies a Central Server that the combined image and data is ready for transmission over Ethernet. The Server controls the image data transfers to maintain optimal network throughput. The Server also controls image deletion by the VIC to ensure that nothing is erased until the Server has safely stored the desired information. If the network goes down, the VIC automatically backs up all messages until the Network connection returns. Each VIC can interface with up to four VIS cameras. Each VIS camera contains a built-in frame buffer to ensure that all camera images can be saved by the VIC before the next vehicle trigger arrives. A network of VIC's can support any width roadway or any number of image capture sites.

The VIC includes a discrete trigger input interface to provide minimum delay between vehicle detection and image capture. The interface supports smart-loops, cross-lane light curtains, overhead laser-based detectors, other leading vehicle detector types. JAI also markets a laser point detector to mount under the VIS camera for portable image capture applications or when single gantry solutions are required. Serial I/O ports interface with other traffic lane devices. e.g., lane controllers, vehicle classifiers, and smart vehicle detectors. The VIC sends images and associated data to the Central Server via a message passing protocol utilizing a standard 10/100BaseT Ethernet link. The Server can also query VIC status and configure parameters of the VIC via the network. Video image capture subsystem The PIPS Technology AutoPlate Secure is a commercial product that automates access control and parking management applications. As a vehicle approaches a facility or guard station, AutoPlate Secure processes license plate image data from one or more PIPS cameras, and is able to identify vehicles as "known" or "unknown", or classify them into one of many user-defined alert categories. AutoPlate Secure provides time and date stamp, lane number, images of both the vehicle and license plate, and other data in real time to booth attendants or integrated barrier or ticketing systems. For parking, event logs captured by AutoPlate Secure include entry and exit times, and images of the vehicle and plate. A database can be searched by date to show all traffic information for that day and over a specified time period. The system may also be queried to identify frequent visitors, duration of stay, and a number of other criteria. PIPS AutoPlate Secure can monitor multiple lanes and multiple sites, and has remote database administration.

The PIPS Technology Spike+ Model #P372P integrates a dual-lens camera with an automatic license plate recognition (ALPR) processor. Such uses so-called "triple flash" technology that varies the infrared camera settings to improve the plate read confidence. The P372P is provided in a weather-proof enclosure, uses internal real-time video self-triggering, has TCP/IP Ethernet with socket and FTP protocols, relay output, RS232, IP connectivity over GPRS/GSM. It can send SMS text messages on database hits or events.

SUMMARY OF THE INVENTION

Briefly, a camera embodiment of the present invention comprises a CCD imaging device, an infrared illumination source, and a power modulator for amplitude modulating the infrared illumination, e.g., with a 7-kHz tone. A beam splitter is set in front of the CCD imaging device, and a photo-diode array is attached to the beam splitter to detect modulated infrared light returning from the same field of vision as the CCD imaging device Various tone filters, and triggers connected to the tone filters, will cause the CCD imaging device to take a digital picture when the returning modulated infrared light exceeds some threshold and comes from right areas of a picture frame. Such digital pictures will most probably include an image of a vehicle license plate that can be processed, and the results used to extract the registration data from a database.

An advantage of the present invention is that a self-contained camera is provided that needs no light sensor or external trigger device.

Another advantage of the present invention is that a very compact system is provided that will make efficient use of character recognition computing resources.

These and other objects and advantages of the present invention will no doubt become obvious to those of ordinary skill in the art after having read the following detailed description of the preferred embodiments which are illustrated in the drawing figure.

IN THE DRAWINGS

DETAILED DESCRIPTION OF THE PREFERRED EMBODIMENT

Figure 1:
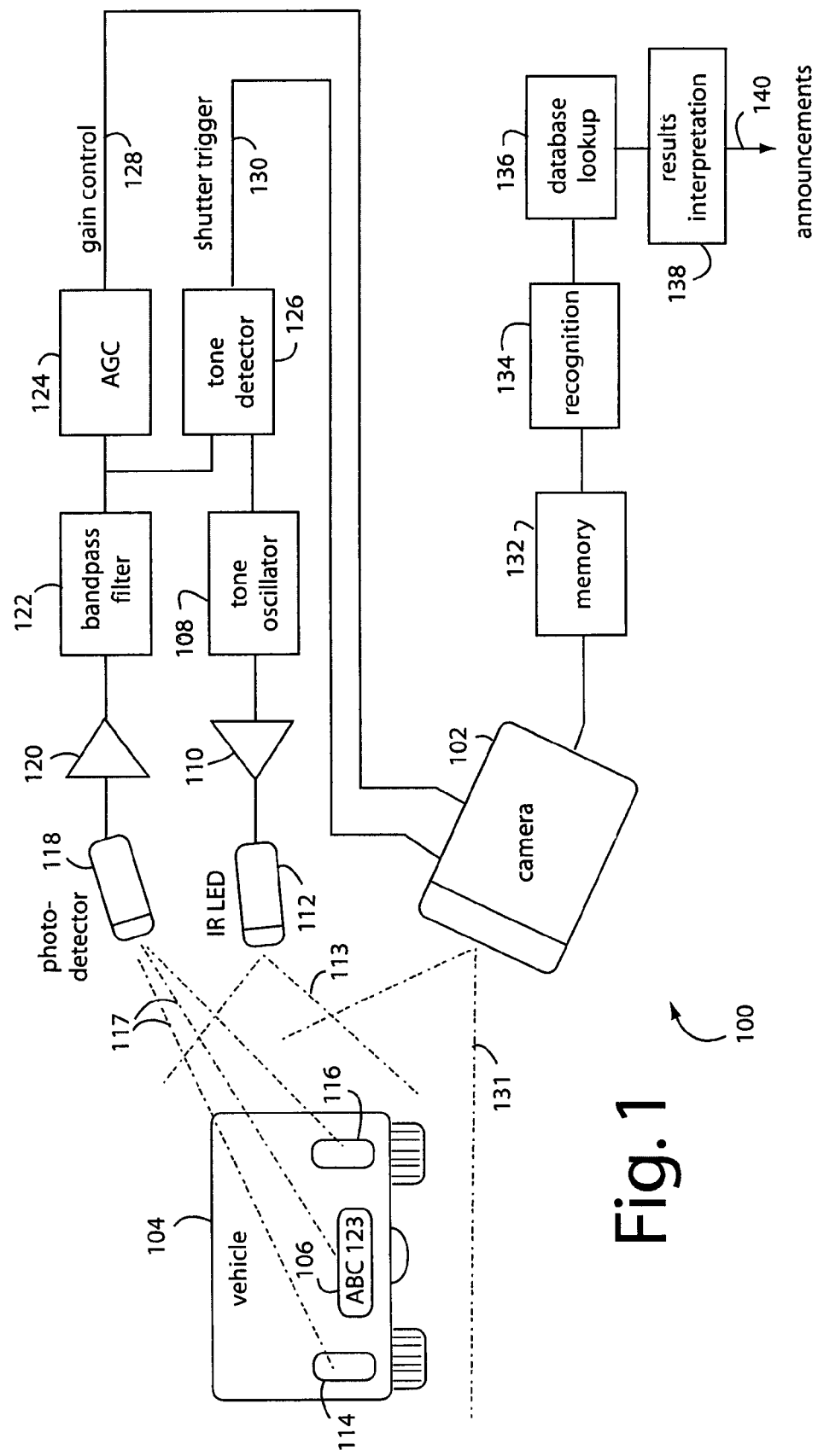
FIG. 1 is a functional block diagram of a license plate recognition system embodiment of the present invention.

A license plate recognition system embodiment of the present invention is illustrated in FIG. 1 and is referred to herein by the general reference numeral 100. The license plate recognition system 100 uses a camera to automatically collect digital images of a vehicle 104 with a retro-reflective license plate 106. Such license plate 106 will typically have number and letter characters, e.g., "ABC 123", that can provide information for an index into a vehicle registration database. Law enforcement, traffic engineering, and even parking systems would find system 100 useful for checking current registration fee payments, wants and warrants, trip delay detection, and ticket-less in-and-out parking.

A typical system 100 comprises a tone oscillator (OSC) 108 and power amplifier 110 to drive an infrared (IR) light emitting diode (LED) 112. One or more LED's can be assembled to produce a modulated IR light 113, e.g., modulated with 7-kHz tone, is used to illuminate a field of view through which vehicle 104 and others will pass. When they do, license plate 106 and many other highly reflective sources, such as taillights 114 and 116, will return strong modulated-IR light reflections 117. These are sensed by a photo-detector array 118 and amplified by a pre-amplifier 120. Such photo-detector array 118 is sensitive to light 400-1000 nanometers wavelength. A bandpass filter 122, e.g., set to pass 7-kHz, strips out all other noise. A tone detector 126 determines if the modulation received matches that transmitted from IR LED 112, e.g., using synchronous detection.

An automatic gain control (AGC) 124 assumes the amplitude of the filtered tone signal from bandpass filter 122 will represent how well lit the field-of-view is, and will produce an automatic gain control signal 128 for camera 102.

The tone detector 126 will issue a shutter trigger 130 to camera 102 for it to take a photo of its field-of-view 131 at that instant, or after some delay. The photo-detector array 118 can be positioned and aimed such that particular small points in the camera's field-of-view 131 will be monitored. So that only when a likely target passes into or out of those points will shutter trigger 130 be issued to camera 102.

The objective in being very selective in how, when, and how many shutter triggers 130 are issued is to enable the best shot of license plate 106, and to reduce or eliminate redundant or blank photos that could otherwise overload and overburden the post processing that must be done. The trigger signal could also be sent simultaneously to a second camera with a wider field of view giving both a detailed and an overview picture of the scene.

Photos of vehicle 104 with license plate 106 are stored in a memory 132 and processed by a recognition processor 134 that will illicit the license plate characters. Such information is then useful in a database lookup 136. Any vehicle registration "hits" are returned to a results interpretation processor 138, and announcements 140 are output according to pre-defined preferences. General packet radio service (GPRS) wireless technology can be used to transmit each license plate reading.

In a typical installation that produced good results, the camera 102 and IR LED 112 were about eleven meters from where vehicle 104 was to be imaged. For example, from inside a patrol car or mounted on a light standard on the roadside. The IR LED 112 was an Osram Golden Dragon LED with a two-degree lens. The white light level at license plate 106 ranged 17-323 fL. The camera 102 was mounted in a remote, road-side location where it would be near the vehicle traffic of interest. Parts of the post-processing, e.g., database lookup 136, interpretation processor 138, and announcements 140, were located at a central server and connected to the rest of the system 100 by conventional Internet and wireless communications. Many such cameras and their outputs could be handled by a single central server.

Figure 2:
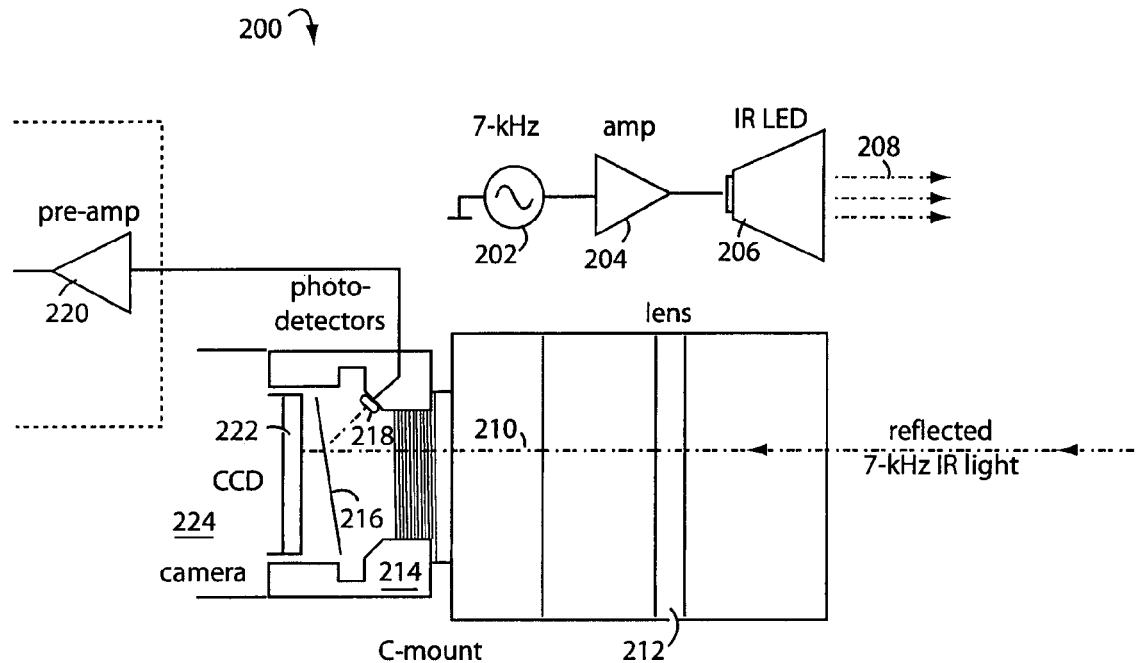
FIG. 2 is a functional block diagram of a modulated light subsystem useful in the license plate recognition system of FIG. 1.

FIG. 2 illustrates a modulated light subsystem useful in the system 100 of FIG. 1, and is referred to herein by the general reference numeral 200. The modulated light subsystem 200 comprises a 7-kHz oscillator 202 that drives a power amplifier 204. These cause an IR-LED 206 to produce an infrared light 208 modulated with a 7-kHz tone. A reflected 7-kHz IR light 210, e.g., from a retro-reflective license plate on a vehicle passing by, passes through a lens 212 on a C-mount 214. An IR-cut filter 216 is set at an angle so a bank of photo-detectors 218 will receive light from pre-selected portions of the overall field-of-view. A pre-amplifier 220 boosts the signal for demodulation to produce a camera trigger. A CCD device 222 is mounted in the front end of a camera 224, and will be used to take digital images of the vehicles passing by.

Figure 3:
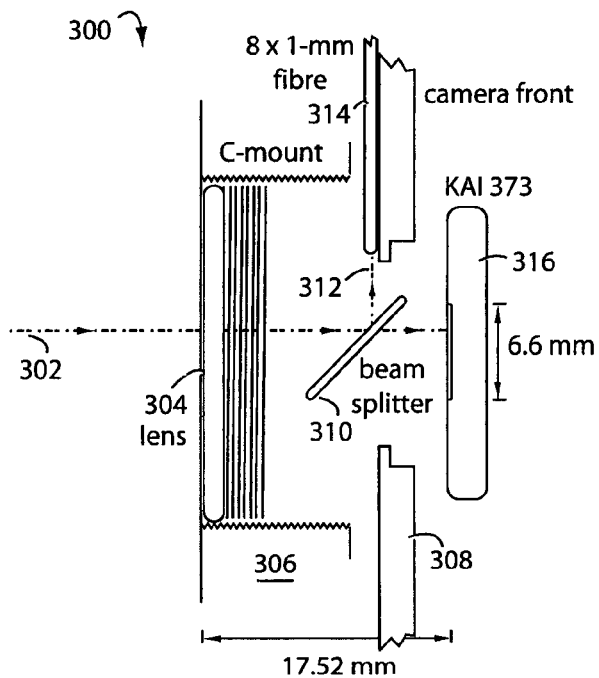
FIG. 3 is a diagram showing an alternative way to arrange the photo-detection. A trigger detector pipes reflected modulated IR light down fiberoptics to PC-board mounted photo-detectors.

FIG. 3 show an alternative way to arrange the photo-detection, in a trigger detector 300. A reflected modulated IR-light 302 enters the camera through a lens 304 on a C-mount 306 mounted to the camera front 308. A beam splitter 310 is tilted back at a 45-degree angle and reflections 312 will be received into the ends of fiber-optic cables 314. These will conduct the light 312 down to PC-mounted photo-detectors, making for a more rugged system overall. Here, a KAI-373 type imaging device 316 was used that had an imaging area 6.6 mm in height. It was set back front the front of lens 304 by about 17.52 mm, in one instance that worked well.

Figure 4:
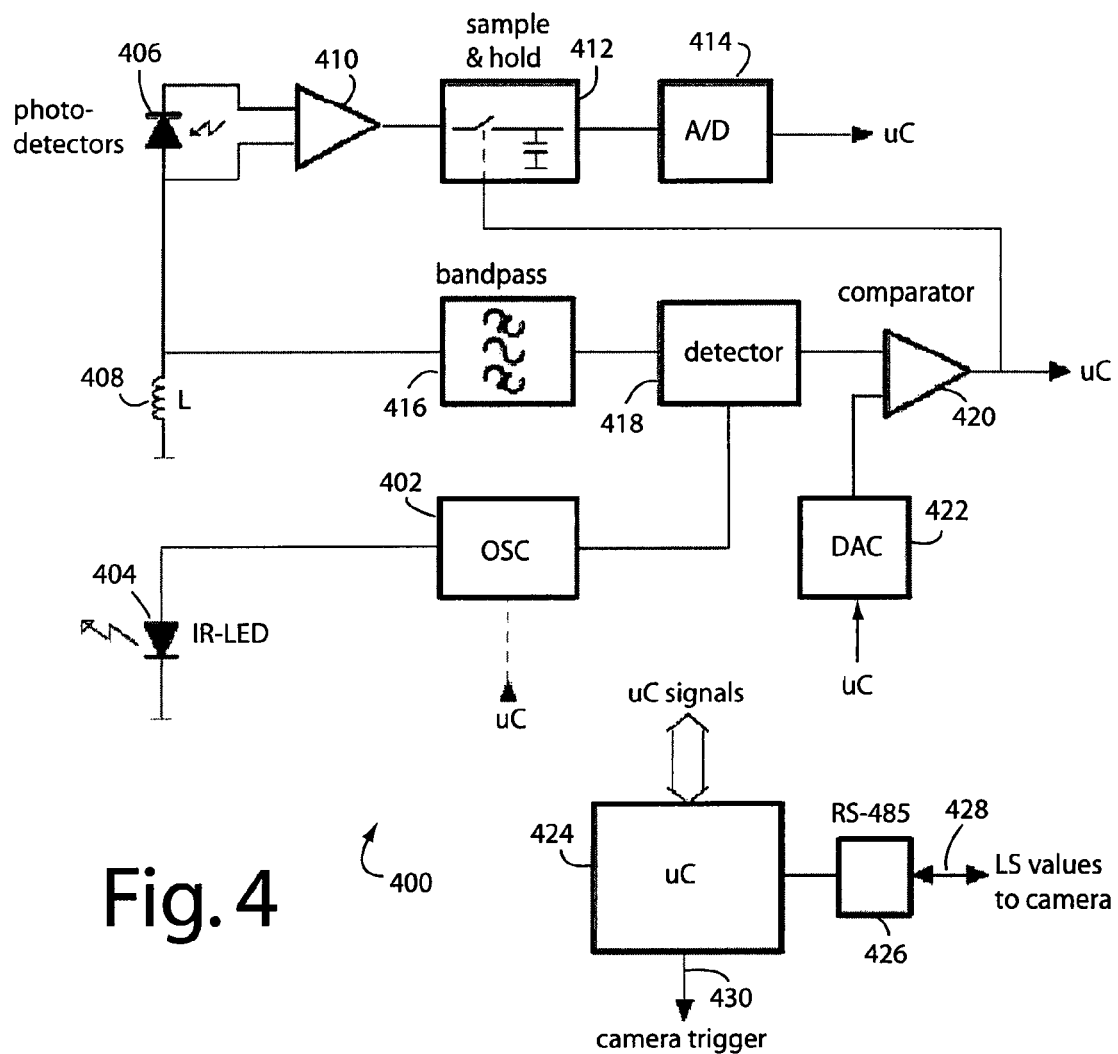
FIG. 4 is a schematic diagram of a printed circuit assembly embodiment of the present invention, and would be useful in the situations shown FIGS. 1-3.

FIG. 4 represents a printed circuit assembly (PSA) embodiment of the present invention, and is referred to herein by the general reference numeral 400. PSA 400 includes a tone oscillator (OSC) 402 operating at a frequency empirically derived as producing the fewest false trigger of a vehicle license plate recognition camera system. OSC 402 powers an IR-LED 404 and that results in an amplitude modulation (AM) in the kilohertz range on an infrared light carrier. A number of PC-mounted photo-detectors 406 receive their optical inputs from fibers routed to pipe potions of the camera's field of view to them. A large inductor (L) 408 removes a direct current (DC) portion of the signal. A differential amplifier 410 boosts the received modulation signals to a sample and hold 412. An analog-to-digital converter (A/D) 414 converts the sampled analog signals to digital for computer processing. A bandpass filter 416 passes only the modulated tones to a synchronous detector 418. A sample of the original tone is tapped from OSC 402. The detector 418 will produce a DC output proportional to the strength of the received light. A comparator 420 has its trigger threshold set by a digital-to-analog converter (DAC) 422 that receives setpoints from a micro-controller (uC) 424. A trigger from comparator 420 will cause the sample and hold 412 to latch and a sample amplitude will be obtained. The uC reads this through A/D 414 and uses it to set camera gain and other parameters through serial communication with RS-485 drivers 426 and signals 428. A camera trigger 430 may be delayed from comparator 420 firing according to various criteria experimentally obtained.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A camera trigger method, comprising:
amplitude modulating a light emitter with a tone in the kilohertz range;
illuminating a field-of-view with amplitude modulated light produced by said light emitter;
sensing light reflected from said field-of-view;
filtering said light reflected from said field-of-view to extract any amplitude modulation related to said tone; and
triggering a camera to take a picture if said amplitude modulation related to said tone was received in the step of sensing.

2. The camera trigger method of claim 1, further comprising:
selecting particular spots in said camera's field-of-view in which said reflected light is detected in the step of sensing.

3. The camera trigger method of claim 2, further comprising:
beam-splitting said reflected light at a point in front of said camera; and
positioning photo-detectors in one of the light beams separated in the step of beam-splitting to detect amplitude modulated infrared light returning from the same field of vision as said camera.

4. A camera trigger, comprising:
a tone oscillator;
a light emitter amplitude modulated with a tone from the tone oscillator for illuminating a field-of-view with amplitude modulated light;
a photo-detector for sensing amplitude modulated light reflected from said field-of-view;
a filter for selecting light reflected from said field-of-view to extract any amplitude modulation related to said tone; and
an output for triggering a camera to take a picture if said amplitude modulation related to said tone was received.

5. The camera trigger of claim 4, further comprising:
at least one photo-detector disposed in particular spots in said camera's field-of-view in which said reflected amplitude modulated light can be detected.

6. The camera trigger of claim 5, further comprising:
a beam-splitter for separating said reflected light into two light beams at a point in front of said camera; and
photo-detectors disposed in one of said two light beams separated and providing for the detection of amplitude modulated infrared light.

7. A self-triggered camera system, comprising:
a digital camera;
an automatic license plate recognition processor connected to receive digital images from the camera, and able to produce data about any license plates it recognizes;
a tone oscillator with an amplitude modulated output;
an infrared (IR) light emitter amplitude modulated with a tone in the kilohertz range from the tone oscillator and for illuminating a field-of-view with amplitude modulated IR light;
a photo-detector for sensing light reflected from said field-of-view;
an IR filter for selecting IR light reflected from said field-of-view to extract any amplitude modulation related to said tone; and
an output for triggering the camera to take a picture if said amplitude modulation related to said tone was received.

8. The camera system of claim 7, further comprising:
an array of photo-detectors disposed in particular spots in said camera's field-of-view in which said reflected light can be examined for amplitude modulated IR light.

9. The camera system of claim 7, further comprising:
a beam-splitter for separating said reflected light into two light beams at a point in front of said camera; and
at least one photo-detector disposed in one of said two light beams separated to detect amplitude modulated IR light.

* * * * *